United States Patent
Lachapelle et al.

(10) Patent No.: US 12,350,643 B2
(45) Date of Patent: Jul. 8, 2025

(54) ELECTROLYTE TREATMENT SYSTEM AND METHOD

(71) Applicant: Pacific Industrial Development Corporation, Ann Arbor, MI (US)

(72) Inventors: Jeffery Lachapelle, Northville, MI (US); David Shepard, Canton, MI (US); Ashwin Sankaran, Arnhem (NL); Wei Wu, Ann Arbor, MI (US); Yunkui Li, Ann Arbor, MI (US)

(73) Assignee: Pacific Industrial Development Corporation, Ann Arbor, MI (US)

( * ) Notice: Subject to any disclaimer, the term of this patent is extended or adjusted under 35 U.S.C. 154(b) by 452 days.

(21) Appl. No.: 17/740,403

(22) Filed: May 10, 2022

(65) Prior Publication Data
US 2022/0379284 A1 Dec. 1, 2022

Related U.S. Application Data

(60) Provisional application No. 63/188,016, filed on May 13, 2021.

(51) Int. Cl.
*B01D 15/36* (2006.01)
*B01J 20/02* (2006.01)
(Continued)

(52) U.S. Cl.
CPC .......... *B01J 20/18* (2013.01); *B01D 15/362* (2013.01); *B01J 20/0237* (2013.01);
(Continued)

(58) Field of Classification Search
CPC ...... B01D 15/00; B01D 15/10; B01D 15/362; B01J 20/18; B01J 20/28052
See application file for complete search history.

(56) References Cited

U.S. PATENT DOCUMENTS 4,726,818 A * 2/1988 Yeung .................... B01D 15/00
95/124
5,728,489 A 3/1998 Gao et al.
(Continued)

FOREIGN PATENT DOCUMENTS

| JP | 2019013885 A | * | 1/2019 |
| WO | 2019054220 A1 | | 3/2019 |
| WO | 2021087190 A1 | | 5/2021 |
| WO | 2021087191 A1 | | 5/2021 |

OTHER PUBLICATIONS

Yamanaka et al.—JP 2019013885A FIT Translation (Year: 2019).*
(Continued)

*Primary Examiner* — Bradley R Spies
(74) *Attorney, Agent, or Firm* — Dickinson Wright PLLC

(57) ABSTRACT

An apparatus, system, and method for removing impurities from a non-aqueous electrolyte used in an electrochemical cell. The apparatus includes a vessel having one or more chambers with an inlet and an outlet configured to allow the flow of the electrolyte through the one or more chambers; and an inorganic scavenging agent located within the one or more chambers. The inorganic scavenging agent includes one or more types of zeolite particles, at least one type of absorbent filler particles, or a combination of the zeolite and absorbent filler particles. The inorganic scavenging agent absorbs one or more of moisture, free transition metal ions, or hydrogen fluoride (HF) that is present as impurities in the non-aqueous electrolyte.

20 Claims, 8 Drawing Sheets

(51) Int. Cl.
  *B01J 20/04* (2006.01)
  *B01J 20/08* (2006.01)
  *B01J 20/10* (2006.01)
  *B01J 20/18* (2006.01)
  *B01J 20/28* (2006.01)

(52) U.S. Cl.
  CPC ......... *B01J 20/0281* (2013.01); *B01J 20/045* (2013.01); *B01J 20/046* (2013.01); *B01J 20/08* (2013.01); *B01J 20/103* (2013.01); *B01J 20/28004* (2013.01); *B01J 20/28016* (2013.01); *B01J 20/28052* (2013.01)

(56) References Cited

U.S. PATENT DOCUMENTS

| | | |
|---|---|---|
| 2012/0261328 A1 | 10/2012 | Shimada et al. |
| 2018/0254531 A1* | 9/2018 | Xiao ................ H01M 10/0568 |
| 2019/0067744 A1 | 2/2019 | Xiao et al. |

OTHER PUBLICATIONS

Grande, Carlos A., et al. "Propane/propylene separation with Li-exchanged zeolite 13X." Chemical Engineering Journal 160.1 (2010): 207-214. (Year: 2010).*

Xu, Jiagang, et al. "Multifunctional lithium-ion-exchanged zeolite-coated separator for lithium-ion batteries." ACS Applied Energy Materials 1.12 (2018): 7237-7243. (Year: 2018).*

* cited by examiner

ELECTROLYTE TREATMENT SYSTEM AND METHOD

FIELD

This invention generally relates to inorganic scavenging agents that remove HF, moisture, or other impurities present in the electrolyte used in an electrochemical cell, such as a lithium-ion secondary battery. More specifically, this disclosure relates to an apparatus and system, as well as a method of using a mixture of zeolite particles and absorbent filler particles as the inorganic scavenging agents.

BACKGROUND

The statements in this section merely provide background information related to the present disclosure and may not constitute prior art.

One key advantage of lithium-ion secondary cell batteries is that they are rechargeable several times before becoming ineffective. The ability of a lithium-ion secondary battery to undergo the charge-discharge cycle multiple times arises from the reversibility of the redox reactions that take place. Lithium-ion secondary batteries, because of their high energy density, are widely applied as the energy sources in many portable electronic devices (e.g., cell phones, laptop computers, etc.), power tools, electric vehicles, and grid energy storage.

However, a variety of factors exist that may cause the performance of lithium-ion secondary batteries to degrade. One of these factors is the existence of various malicious species in the non-aqueous electrolyte. These malicious species include moisture (e.g., water or water vapor), hydrogen fluoride (HF), and dissolved transition-metal ions ($TM^{n+}$).

Moisture in the electrolyte mainly arises as a fabrication residue and from the decomposition of the organic electrolyte. Although a dry environment is desired, the presence of moisture usually is not thoroughly excluded from the conventional manufacturing processes used in the production of a battery or battery cell. The organic solvent in the electrolyte is inclined to decompose to yield $CO_2$ and $H_2O$, especially when the battery is operated at a high temperature. The water ($H_2O$) can react with a lithium salt, such as $LiPF_6$, resulting in the generation of lithium fluoride (LiF) and hydrogen fluoride (HF). The reactions that occur from moisture residue being present in a Li-ion battery are shown in Equations 1) and 2), wherein M stands for a transition metal that is typically present in the material of the positive electrode.

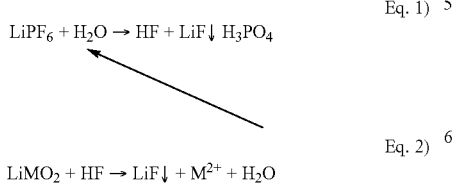

The lithium fluoride (LiF), which is insoluble, can deposit on the surfaces of the active materials of the anode or cathode forming a solid electrolyte interface (SEI). This solid electrolyte interface (SEI) may reduce or retard the lithium-ions (de)intercalation and inactivate the surface of the active material, thereby, leading to a poor rate capability and/or capacity loss.

Furthermore, hydrogen fluoride (HF), when present, may attack the positive electrode, which contains transition metal and oxygen ions, resulting in the formation of more water and transition metal compounds that are compositionally different from the active material. When water is present and acts as a reactant, the reactions that occur may become cyclic, resulting in continual damage to the electrolyte and the active material.

In addition, the transition metal compounds that are formed may be insoluble and electrochemically inactive. These transition metal compounds may reside on the surface of the positive electrode, thereby, forming a solid electrolyte interphase (SEI) or passivation layer. On the other hand, any soluble transition metal compounds may dissolve into the electrolyte resulting in transition metal ions ($TM^{n+}$). These free transition metal ions, such as, for example, $Mn^{2+}$ and $Ni^{2+}$, can move towards the anode where they may be deposited as an SEI leading to the introduction of a variety of different reactions. These reactions, which may consume the active materials of the electrodes and the lithium-ions present in the electrolyte, can also lead to capacity loss in the lithium-ion secondary battery.

During operation, it is desirable that the Coulombic or current efficiency and the discharge capacity exhibited by a lithium-ion secondary battery remains relatively constant. The Coulombic efficiency describes the charge efficiency by which electrons are transferred within the battery. The discharge capacity represents the amount of charge that may be extracted from a battery. Lithium-ion secondary batteries may experience a degradation in capacity and/or efficiency due to prolonged exposure to moisture (e.g., water), hydrogen fluoride (HF), and dissolved transition-metal ions ($TM^{n+}$). In fact, the lifetime of a lithium-ion secondary battery can become severely limited once 20% or more of the original reversible capacity is lost or becomes irreversible. The ability to prolong the rechargeable capacity and overall lifetime of lithium-ion secondary batteries can decrease the cost of replacement and reduce the environmental risks for disposal and recycling.

DESCRIPTION OF THE DRAWINGS

In order that the disclosure may be well understood, there will now be described various forms thereof, given by way of example, reference being made to the accompanying drawings. The components in each of the drawings may not necessarily be drawn to scale, but rather emphasis is placed upon illustrating the principles of the invention.

Figure 1:
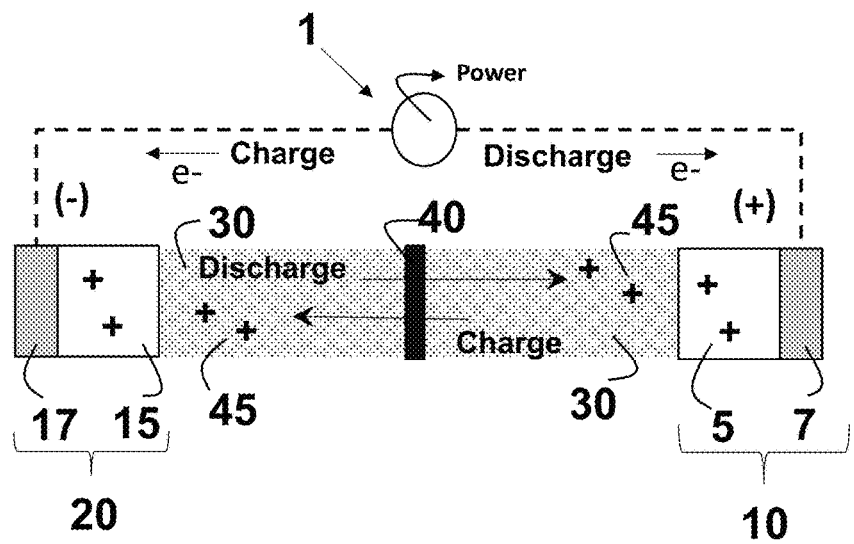
FIG. 1 is a schematic representation of a lithium-ion secondary cell formed according to the teachings of the present disclosure in which the electrolyte has been treated to remove impurities according to the teachings of the present disclosure.

The drawings described herein are for illustration purposes only and are not intended to limit the scope of the present disclosure in any way.

DETAILED DESCRIPTION

The following description is merely exemplary in nature and is in no way intended to limit the present disclosure or its application or uses. For example, the electrolyte treated and used according to the teachings contained herein is described throughout the present disclosure in conjunction with a secondary cell for use in a lithium-ion secondary battery in order to more fully illustrate the structural elements and the use thereof. The incorporation and use of such treated electrolytes in other applications, including without limitation in other electrochemical cells, such as for example a primary cell used in a lithium-ion battery, is contemplated to be within the scope of the present disclosure.

It should be understood that throughout the description and drawings, corresponding reference numerals indicate like or corresponding parts and features. As used herein a "cell" refers to the basic electrochemical unit of a battery that contains the electrodes, separator, and electrolyte. In comparison, a "battery" refers to a collection of cell(s), e.g., one or more cells, and includes a housing, electrical connections, and possibly electronics for control and protection.

For the purpose of this disclosure, the terms "about" and "substantially" are used herein with respect to measurable values and ranges due to expected variations known to those skilled in the art (e.g., limitations and variability in measurements).

For the purpose of this disclosure, the terms "at least one" and "one or more of" an element are used interchangeably and may have the same meaning. These terms, which refer to the inclusion of a single element or a plurality of the elements, may also be represented by the suffix "(s)" at the end of the element. For example, "at least one metal", "one or more metals", and "metal(s)" may be used interchangeably and are intended to have the same meaning.

The present disclosure generally provides an apparatus and system, as well as a method of using said apparatus in the treatment of an electrolyte prior to the use of the electrolyte in an electrochemical cell, such as a secondary lithium-ion cell. Referring to FIG. 1, a secondary lithium-ion cell 1 generally comprises a positive electrode 10, a negative electrode 20, a non-aqueous electrolyte 30, and a separator 40. The positive electrode 10 comprises an active material that acts as a cathode 5 for the cell 1 and a current collector 7 that is in contact with the cathode 5, such that lithium ions 45 flow from the cathode 5 to the anode 15 when the cell 1 is charging. Similarly, the negative electrode 20 comprises an active material that acts as an anode 15 for the cell 1 and a current collector 17 that is in contact with the anode 15, such that lithium ions 45 flow from the anode 15 to the cathode 5 when the cell 1 is discharging. The contact between the cathode 5 and the current collector 7, as well as the contact between the anode 15 and the current collector 17, may be independently selected to be direct or indirect contact; alternatively, the contact between the anode 15 or cathode 5 and the corresponding current collector 17, 7 is directly made.

The non-aqueous electrolyte 30 is located between and in contact with, i.e., in fluid communication with, both the negative electrode 20 and the positive electrode 10. This non-aqueous electrolyte 30 supports the reversible flow of lithium ions 45 between the positive electrode 10 and the negative electrode 20. The separator 40 is placed between the positive electrode 10 and negative electrode 20, such that the separator 40 separates the anode 15 and a portion of the electrolyte 30 from the cathode 5 and the remaining portion of the electrolyte 30. The separator 40 is permeable to the reversible flow of lithium ions 45 there through.

Referring now to FIGS. 2A-2G, the apparatus 50 for removing impurities from a non-aqueous electrolyte used in an electrochemical cell generally comprises a vessel 55 that includes one or more chambers 70 having an inlet 60 and an outlet 65. The inlet 60 and the outlet 65 are configured to allow the flow of the electrolyte 30 through the one or more chambers 70. The apparatus further includes an inorganic scavenging agent 75 located within the one or more chambers 70. This inorganic scavenging agent 75 comprises one or more types of zeolite particles 85, at least one type of absorbent filler particles 80, or a combination of the zeolite 85 and absorbent filler 80 particles. The inorganic scavenging agent 75 absorbs one or more of moisture, free transition metal ions, or hydrogen fluoride (HF) that is present as impurities in the non-aqueous electrolyte.

The vessel 55 in the apparatus is constructed with a chamber 70 that has a predetermined volume. This predetermined volume may, without limitation, be between about 250 milliliters (mL) and 200 liters; alternatively, the volume is between 500 mL and 100 liters; alternatively, between 5 liters and 75 liters; alternatively, greater than 1 liter. The vessel 55 may be made from a metal, plastic, ceramic, or a combination thereof provided that the vessel can withstand exposure to a pressure up to 500 psi and to a temperature of about 50° C. during operation. The vessel 55 may be constructed for limited use, e.g., filling a single electrochemical cell, or for multi-use, e.g., filling multiple electrochemical cells. Alternatively the pressure to which the vessel 55 is exposed may be between atmospheric pressure and 500 psi; alternatively between 100 psi and about 450 psi. The temperature may further be between room temperature and 50° C.; alternatively, between about 30° C. and about 50° C. In addition, the materials used in the construction of the apparatus 55 should be chemically resistant to the degradation of its physical properties in the presence of the electrolyte under the pressure and temperature conditions employed.

Still referring to FIGS. 2A-2G, the apparatus 50 further comprises at least one valve 90 configured to allow the flow of the electrolyte through the chamber when the valve is open. The valve 90 may be located at the inlet 60, the outlet 65, or at both the inlet 60 and outlet 65. Each valve may be manually operated or remotely operated by a control system or a controller. A fitting 95 may be located at both the inlet and outlet. Each fitting 95 may comprise a standard piping/threading design, a type of a quick connect design, or the like.

The inorganic scavenging agents 75 used to treat the electrolyte 30 may comprise, consist essentially of, or consist of a mixture of one or more types of zeolite particles 85 and at least one type of absorbent filler particles 80. In order to deal with the problems as discussed above, the zeolite 85 and filler 80 particles act as trapping agents or scavengers for the malicious species present within the electrolyte 30. In other words, the zeolite 85 and filler 80 particles accomplish the objective by effectively absorbing moisture, free transition-metal ions, and/or hydrogen fluoride (HF) selectively, while having no effect on the performance of the non-aqueous electrolyte 30, including the lithium-ions and organic transport medium contained therein. The removal of these malicious species effectively prolongs the battery's calendar and cycle lifetime.

Zeolites are crystalline or quasi-crystalline aluminosilicates comprised of repeating $TO_4$ tetrahedral units with T being most commonly silicon (Si) or aluminum (Al). These repeating units are linked together to form a crystalline framework or structure that includes cavities and/or channels of molecular dimensions within the crystalline structure. Thus, aluminosilicate zeolites comprise at least oxygen (O), aluminum (Al), and silicon (Si) as atoms incorporated in the framework structure thereof. Since zeolites exhibit a crystalline framework of silica ($SiO_2$) and alumina ($Al_2O_3$) interconnected via the sharing of oxygen atoms, they may be characterized by the ratio of $SiO_2:Al_2O_3$(SAR) present in the crystalline framework.

The inorganic additive of the disclosure exhibits a framework topology of a chabazite (framework notation="CHA"), chiavennite (CHI), faujasite (FAU), linde type A (LTA), and laumontite (LAU). The framework notation represents a code specified by the International Zeolite Associate (IZA) that defines the framework structure of the zeolite. Thus, for example, a chabazite means a zeolite in which the primary crystalline phase of the zeolite is "CHA".

The crystalline phase or framework structure of a zeolite may be characterized by X-ray diffraction (XRD) data. However, the XRD measurement may be influenced by a variety of factors, such as the growth direction of the zeolite; the ratio of constituent elements; the presence of an adsorbed substance, defect, or the like; and deviation in the intensity ratio or positioning of each peak in the XRD spectrum. Therefore, a deviation of 10% or less; alternatively, 5% or less; alternatively, 1% or less in the numerical value measured for each parameter of the framework structure for each zeolite as described in the definition provided by the IZA is within expected tolerance.

According to one aspect of the present disclosure, the zeolites 85 of the present disclosure may include natural zeolites, synthetic zeolites, or a mixture thereof. Alternatively, the zeolites are synthetic zeolites because such zeolites exhibit greater uniformity with respect to SAR, crystallite size, and crystallite morphology, as well has fewer and less concentrated impurities (e.g. alkaline earth metals).

According to another aspect of the present disclosure, the one or more types of a zeolite particles 85 may have a $SiO_2:Al_2O_3$(SAR) ratio ranging from about 1 to 100; alternatively, about 2 to 75; alternatively, about 2 to 50; alternatively, between about 2 and 25; alternatively, ranging from about 2 to about 20; alternatively, ranging from about 5 to about 15.

The zeolites 85 may comprise one type of zeolite or a combination of zeolite types selected from zeolites that have a framework chosen as, but not limited to, ABW, AFG, BEA, BHP, CAS, CHA, CHI, DAC, DOH, EDI, ESV, FAU, FER, FRA, GIS, GOO, GON, HEU, KFI, LAU, LTA, LTN, MEI, MER, MOR, MSO, NAT, NES, PAR, PAU, PHI, RHO, RTE, SOD, STI, TER, THO, VET, YUG, and ZSM. Alternatively, the framework of the zeolite is a FAU, MFI, CHA, LTA, or BEA structure, or a combination thereof.

The zeolites 85 may exhibit a morphology that is plate-like, cubic, spherical, or a combination thereof. Alternatively, the morphology is predominately, spherical in nature. These particles may exhibit an average particle size ($D_{50}$) that is in the range of about 1 micrometer (μm) to about 200 micrometers (μm); alternatively about 3 micrometers (μm) to about 150 micrometers (μm); alternatively, 5 micrometers (μm) to about 100 micrometers (μm); alternatively, 7 micrometers (μm) to about 75 micrometers (μm); alternatively, greater than or equal to 1 μm; alternatively, greater than or equal to 5 μm; alternatively, less than 150 μm; alternatively, less than or equal to 100 μm. Scanning electron microscopy (SEM) or other optical or digital imaging methodology known in the art may be used to determine the shape and/or morphology of the inorganic additive. The average particle size and particle size distributions may be measured using any conventional technique, such as sieving, microscopy, Coulter counting, dynamic light scattering, or particle imaging analysis, to name a few. Alternatively, a laser particle analyzer is used for the determination of average particle size and its corresponding particle size distribution.

The zeolites 85 may also exhibit surface area that is in the range of about 5 $m^2/g$ to about 5000 $m^2/g$; alternatively from about 10 $m^2/g$ to about 2500 $m^2/g$; alternatively, from about 10 $m^2/g$ to about 1000 $m^2/g$; alternatively, about 25 $m^2/g$ to about 750 $m^2/g$. The pore volume of the zeolites may be in the range of about 0.05 cc/g to about 3.0 cc/g; alternatively, 0.1 cc/g to about 2.0 cc/g; alternatively 0.15 cc/g to about 1.5 cc/g. The measurement of surface area and pore volume for the zeolites may be accomplished using any known technique, including without limitation, microscopy, small angle x-ray scattering, mercury porosimetry, and Brunauer, Emmett, and Teller (BET) analysis. Alternatively, the surface area and pore volume are determined using Brunauer, Emmett, and Teller (BET) analysis.

The zeolites 85 may include an initial sodium (Na) concentration of about 0.05 wt. % to about 30 wt. % based on the overall weight of the inorganic additive. Alternatively, the initial Na concentration may range from about 0.1 wt. % to about 25 wt. %; alternatively, from about 0.25 wt. % to about 20 wt. %; alternatively, less than 25 wt. %. The zeolite particles may be a lithium-ion exchanged zeolite, such that lithium ions replace at least a portion of the sodium ions in the framework by ion-exchanging. Lithium ions replace some of the initial sodium ions in the framework by ion-exchanging to reach a concentration that is between 0.1 wt. % and 25 wt. %. Alternatively, the concentration of lithium ion is about 0.5 wt. % to about 20 wt. %; alternatively, about 0.75 wt. % to about 15 wt. % based on the overall weight of the Li-exchanged zeolites. The final sodium (Na) concentration in the inorganic additive after undergoing lithium-ion exchange may lower than 15 wt. %; alternatively, less than 10 wt. %; alternatively, less than 7.5 wt. %. When desirable, the zeolites may further include one or more doping elements selecting from Li, Na, Al, Mn, Sm, Y, Cr, Eu, Er, Ga, Zr, and Ti.

The absorbent filler particles 80 in the inorganic scavenging agent 75 may comprise or consist essentially of aluminum oxide, copper sulfate, silica gel, calcium chloride, calcium sulfate, or a mixture thereof. Alternatively, the absorbent filler particles may consist essentially of calcium chloride, silica gel, or a mixture thereof.

The absorbent filler particles 80 may exhibit an average particle size ($D_{50}$) that is in the range of about 1 micrometer ($\mu m$) to about 200 micrometers ($\mu m$); alternatively about 3 micrometers ($\mu m$) to about 150 micrometers ($\mu m$); alternatively, 5 micrometers ($\mu m$) to about 100 micrometers ($\mu m$); alternatively, 7 micrometers ($\mu m$) to about 75 micrometers ($\mu m$); alternatively, greater than or equal to 1 $\mu m$; alternatively, greater than or equal to 5 $\mu m$; alternatively, less than 150 $\mu m$; alternatively, less than or equal to 100 $\mu m$. The absorbent filler particles 80 may have about the same particle size as the zeolite particles 85. Alternatively, the absorbent filler particles 80 may have a smaller particle size than the zeolite particles 85. In order to enhance the packing density when the absorbent filler 80 and zeolite 85 particles are mixed, the particle size ($D_{50}$) for the zeolite particles and the particle size ($D_{50}$) for the absorbent filler particles are different by at least a factor of 1.5; alternatively, by a factor of 2 or more; alternatively, by a factor of about 3; alternatively, by a factor between 2 and 9.

The non-aqueous electrolyte 30 is used to support the oxidation/reduction process and provide a medium for lithium ions to flow between the anode 15 and cathode 5 in the electrochemical cell. The non-aqueous electrolyte 30 may be a solution of a lithium salt in an organic solvent. Several examples of lithium salts, include, without limitation, lithium hexafluorophosphate ($LiPF_6$), lithium bis(oxalato)-borate (LiBOB), and lithium bis(trifluoro methane sulfonyl)imide (LiTFSi). These lithium salts may form a solution with an organic solvent, such as, for example, ethylene carbonate (EC), ethyl methyl carbonate (EMC), diethyl carbonate (DEC), dimethyl carbonate (DMC), propylene carbonate (PC), vinylene carbonate (VC), and fluoroethylene carbonate (FEC), to name a few. A specific example of an electrolyte is a 1 molar solution of $LiPF_6$ in a mixture of ethylene carbonate and diethyl carbonate (EC/DEC=50/50 vol.).

In order to suppress the degradation caused by the factors previously described above, the zeolite particles, preferably ion-exchanged with lithium (Li), and the absorbent filler particles of the present disclosure scavenge the malicious species, including free transition-metal ions, hydrofluoric acid, and/or moisture present in the electrolyte during the production of a secondary Li-ion cell. The end-result of treating the electrolyte using the zeolite particles and absorbent filler particles is an extension of the cell's overall cycle life. Although not wanting to be held to theory, it is believed that the cyclic reactions as shown in equations 1) and 2) are broken by ion-exchange that occurs when the Li-exchanged zeolite and/or filler particles react with HF to form LiF and an H-exchanged zeolite, rather than forming a metal fluoride and water. The inorganic scavenging agents may also scavenge transition-metal cations and hydrofluoric acid via an ion-exchange mechanism.

Figure 2A:
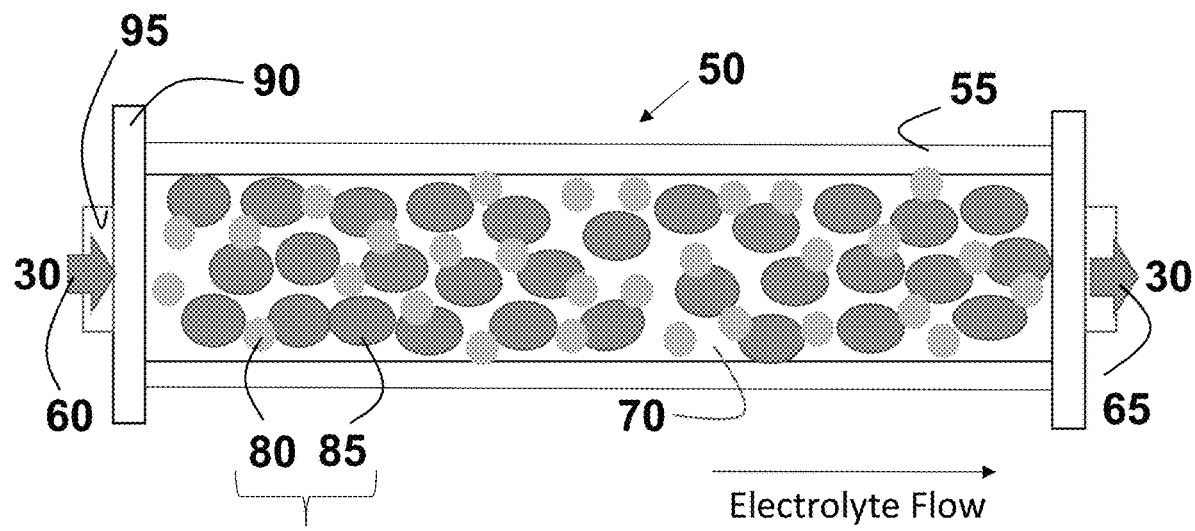
FIG. 2A is a schematic representation of an apparatus for removing impurities in an electrolyte that contains a homogeneous mixture of zeolite particles and absorbent filler particles according to the teachings of the present disclosure.
Figure 2B:
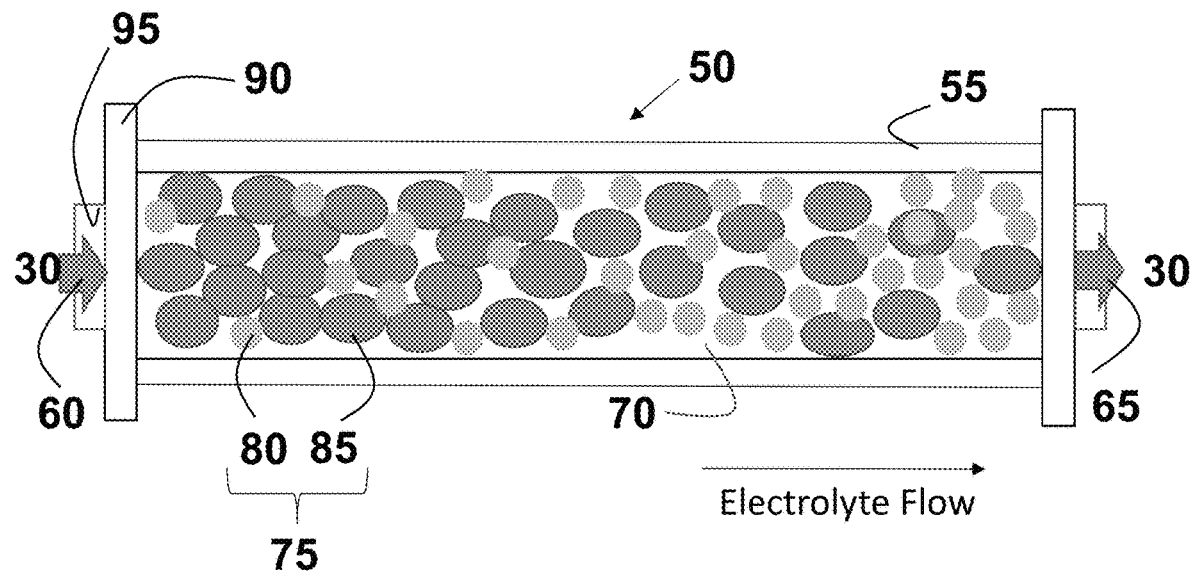
FIG. 2B is a schematic representation of another apparatus containing a gradient mixture of zeolite particles and absorbent filler particles according to the teachings of the present disclosure.
Figure 2C:
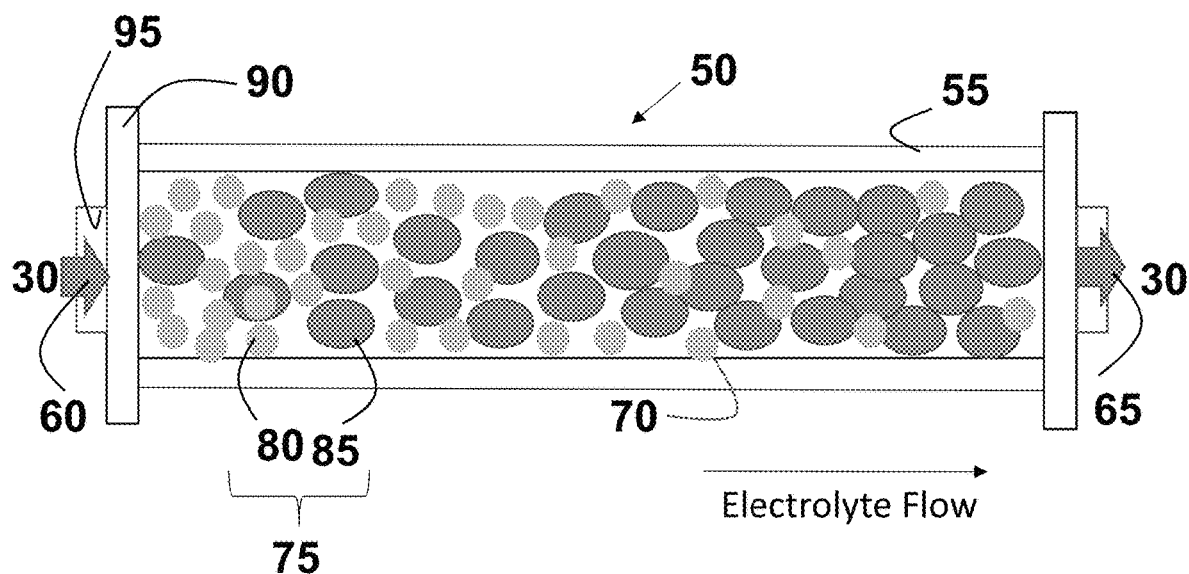
FIG. 2C is a schematic representation of yet another apparatus containing a gradient mixture of zeolite particles and absorbent filler particles according to another aspect of the present disclosure.
Figure 2D:
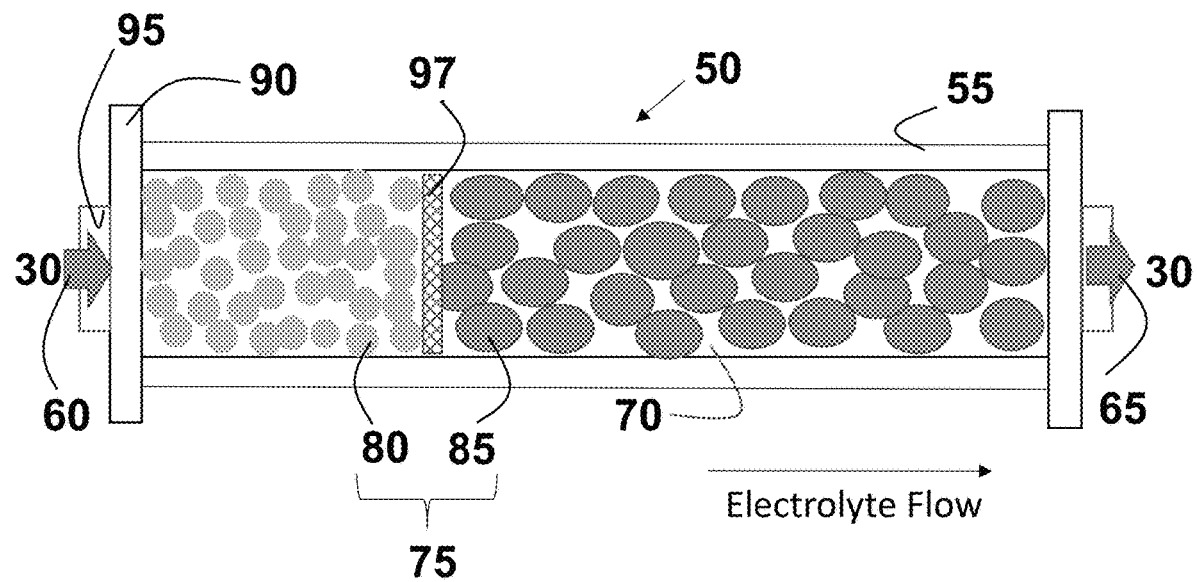
FIG. 2D is a schematic representation of another apparatus containing separated regions of zeolite particles and absorbent filler particles according to the teachings of the present disclosure.
Figure 2E:
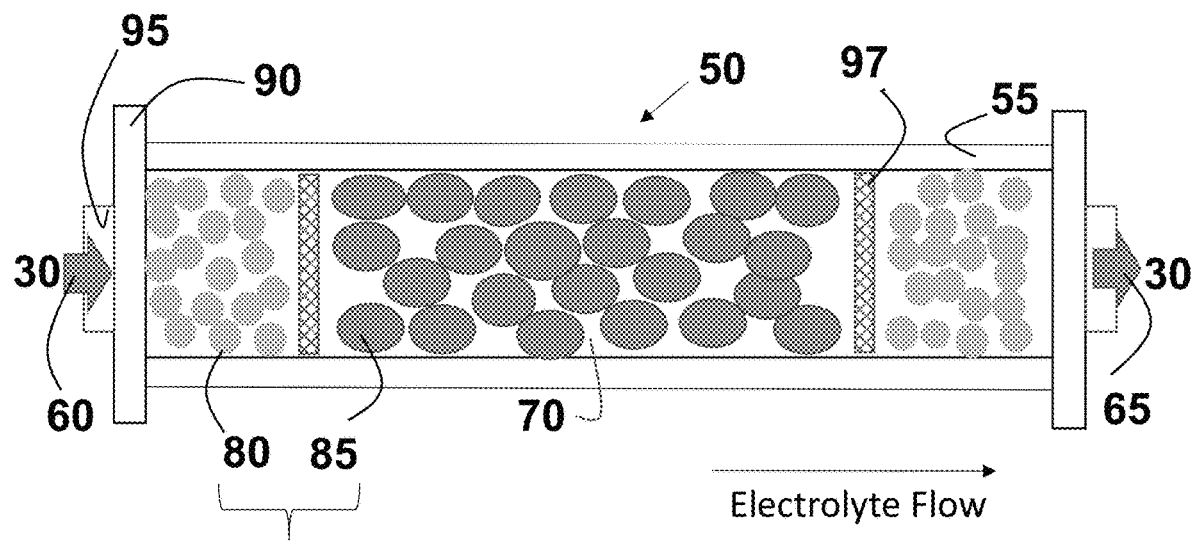
FIG. 2E is a schematic representation of yet another apparatus containing separated regions of zeolite particles and absorbent filler particles according to another aspect of the present disclosure.
Figure 2F:
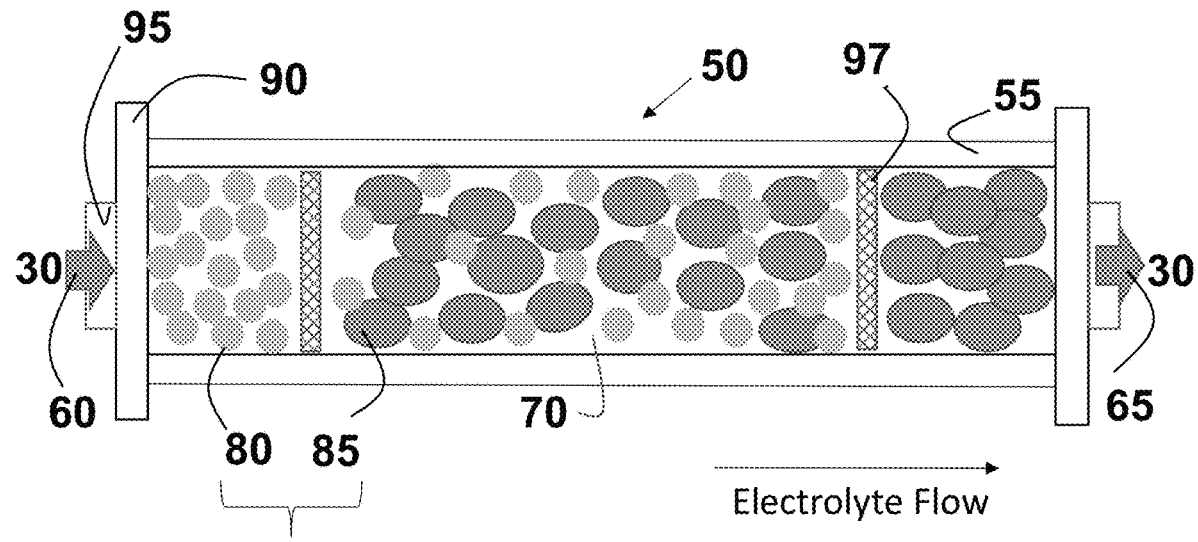
FIG. 2F is a schematic representation of yet another apparatus containing a combination of separated regions of zeolite particles and absorbent filler particles along with a region comprising a mixture of zeolite particles and absorbent filler particles according to another aspect of the present disclosure.
Figure 2G:
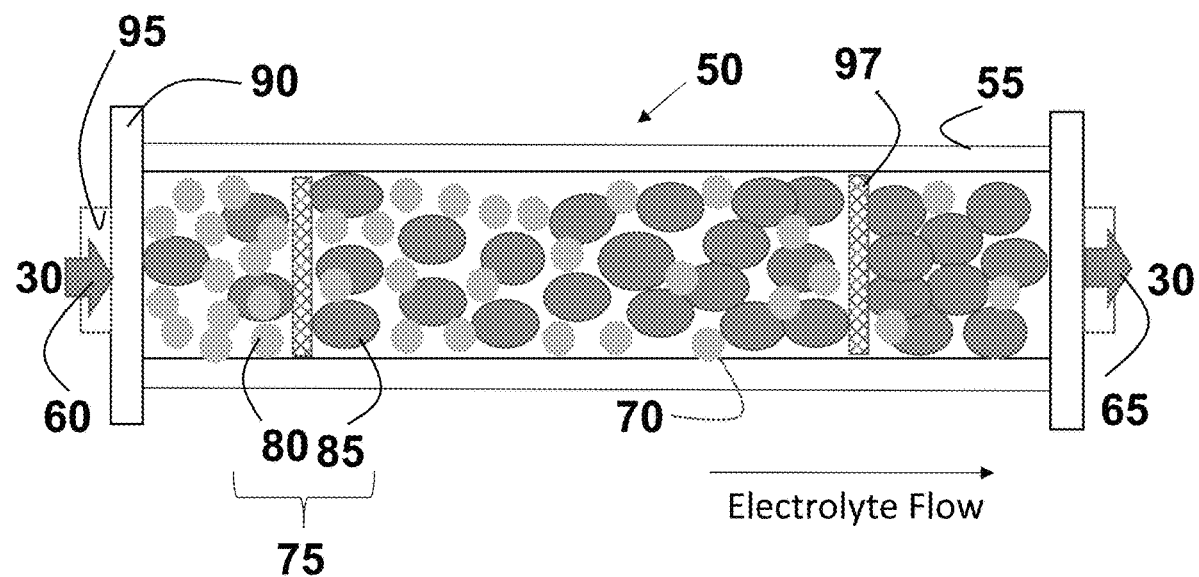
FIG. 2G is a schematic representation of the apparatus of FIG. 2C in which different gradient mixtures of zeolite particles and absorbent filler particles are placed in separated regions according of another aspect of the present disclosure.

Referring once again to FIGS. 2A-2G, the one or more types of zeolite particles 85 and the absorbent filler particles 80 fill the chamber 70. The composition of the inorganic scavenging agent 75 may include a homogenous mixture of the zeolite 85 and absorbent filler 80 particles (FIG. 2A), a gradient mixture of the zeolite 85 and absorbent filler 80 particles (FIGS. 2B-2C, 2G), separated regions of zeolite particles 85 and absorbent filler particles 80 (FIGS. 2D-2E), a combination of separated regions of zeolite particles 85, absorbent filler particles 80, and a gradient mixture thereof (FIG. 2F); or a mixture of zeolite 85 and absorbent filler 80 particles (e.g., gradient mixture) placed into separated regions (FIG. 2G). With respect to a gradient mixture, the amount of zeolite particles 85 may be greater near the inlet 60 of the vessel 55 as shown in FIG. 2B or near the outlet 65 of the vessel 55 as shown in FIGS. 2C and 2G. Similarly, in the separated region, the zeolite particles 85 may be located near the inlet (not shown) or near the outlet 65 as shown in FIGS. 2D and 2F.

The zeolite particles 85 and absorbent filler particles 80 may be separated and held in position by an internal surface of the vessel 55 that forms the chamber 70, by the incorporation of one or more membranes, screens, or filters 97 into the chamber 70, or a combination thereof, provided such membranes, screens, or filters 97 allow the electrolyte to pass there through (FIGS. 2D-2G). The composition of the membranes, screens, or filters 97 is selected to provide resistance against the occurrence of degradation in chemical and mechanical properties in the presence of the electrolyte under the pressure and temperature conditions employed.

The zeolite particles 85 and absorbent filler particles 80 may be present as loosely packed particles as shown in FIGS. 2A-2G. However, the particles may also be compacted to form at least one tablet, disc, or extrudate without exceeding the scope of the present disclosure. The compacted structure should also correspond to the shape of the chamber 70, such that the compacted structure may be easily placed into the chamber 70. When desirable, a combination of loosely packed particles and a compacted tablet, disc, or extrudate may be utilized.

The amount of zeolite particles and absorbent filler particles utilized fills the chamber. The ratio of zeolite particles to absorbent filler particles present in the chamber may be between 10:1 to 1:10; alternatively, between 5:1 to 1:5; alternatively, between 1:3 to 3:1; alternatively, between 1:2 to 2:1; alternatively, about 1:1.

Figure 2H:
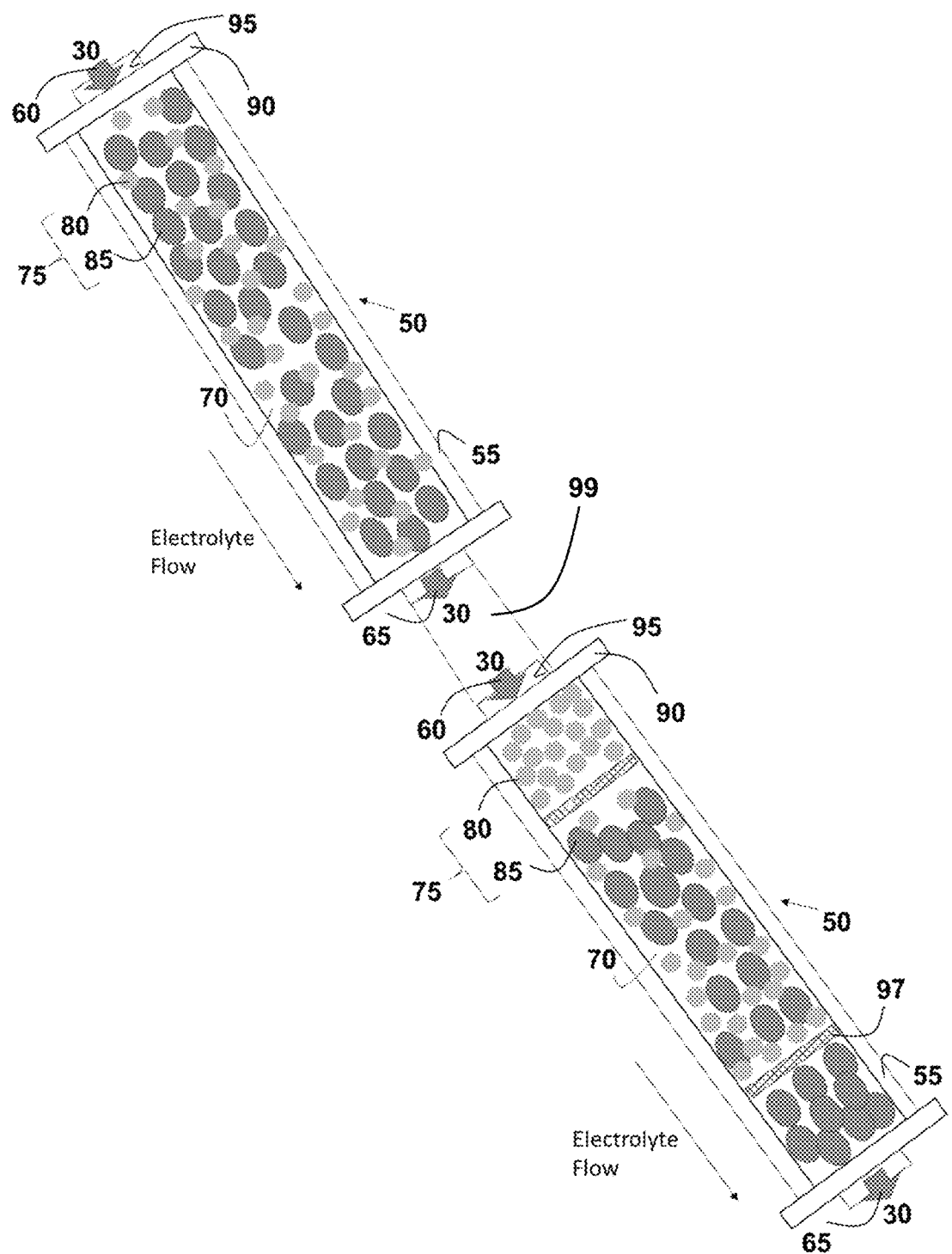
FIG. 2H is a schematic representation of a plurality of the apparatus of FIGS. 2A and 2F being connected together and used in series to increase exposure of the electrolyte to the inorganic scavenging agent according to the teachings of the present disclosure.
Figure 2I:
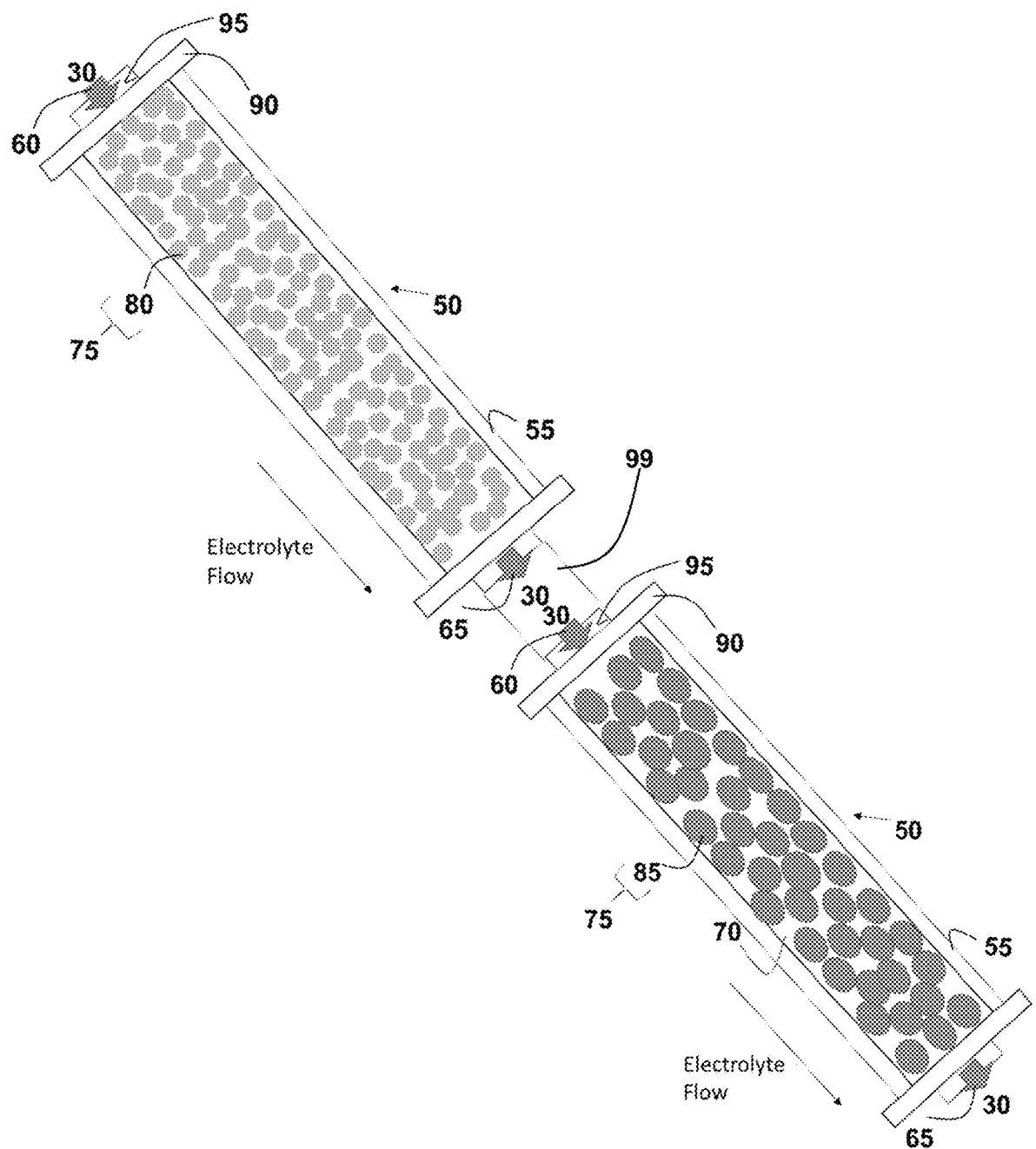
FIG. 2I is a schematic representation of a plurality of apparatus being connected together and used in series wherein each apparatus contains either zeolite particles or absorbent filler particles.

Now referring to FIGS. 2H and 2I, a plurality of the apparatus 50 may be connected or coupled together, such that each apparatus 50 is in fluid communication. The use of a plurality of apparatus 50 coupled in series increases the exposure of the electrolyte to the inorganic scavenging agent 75. Each of the connected apparatus 50 may contain the same distribution of zeolite 85 and absorbent filler 80 particles or a different distribution of zeolite 85 and absorbent filler 80 particles. For example, in FIG. 2H a combination of the apparatus 50 previously shown in FIGS. 2A and 2F are connected or coupled for use in series. The apparatus 50 may be connected together using any conventional coupling 99, including without limitation a quick connection. When desirable, the apparatus 50 that are coupled together may also each contain entirely either the zeolite particles 85 or the absorbent filler particles 80 as shown in FIG. 2I.

Figure 3:
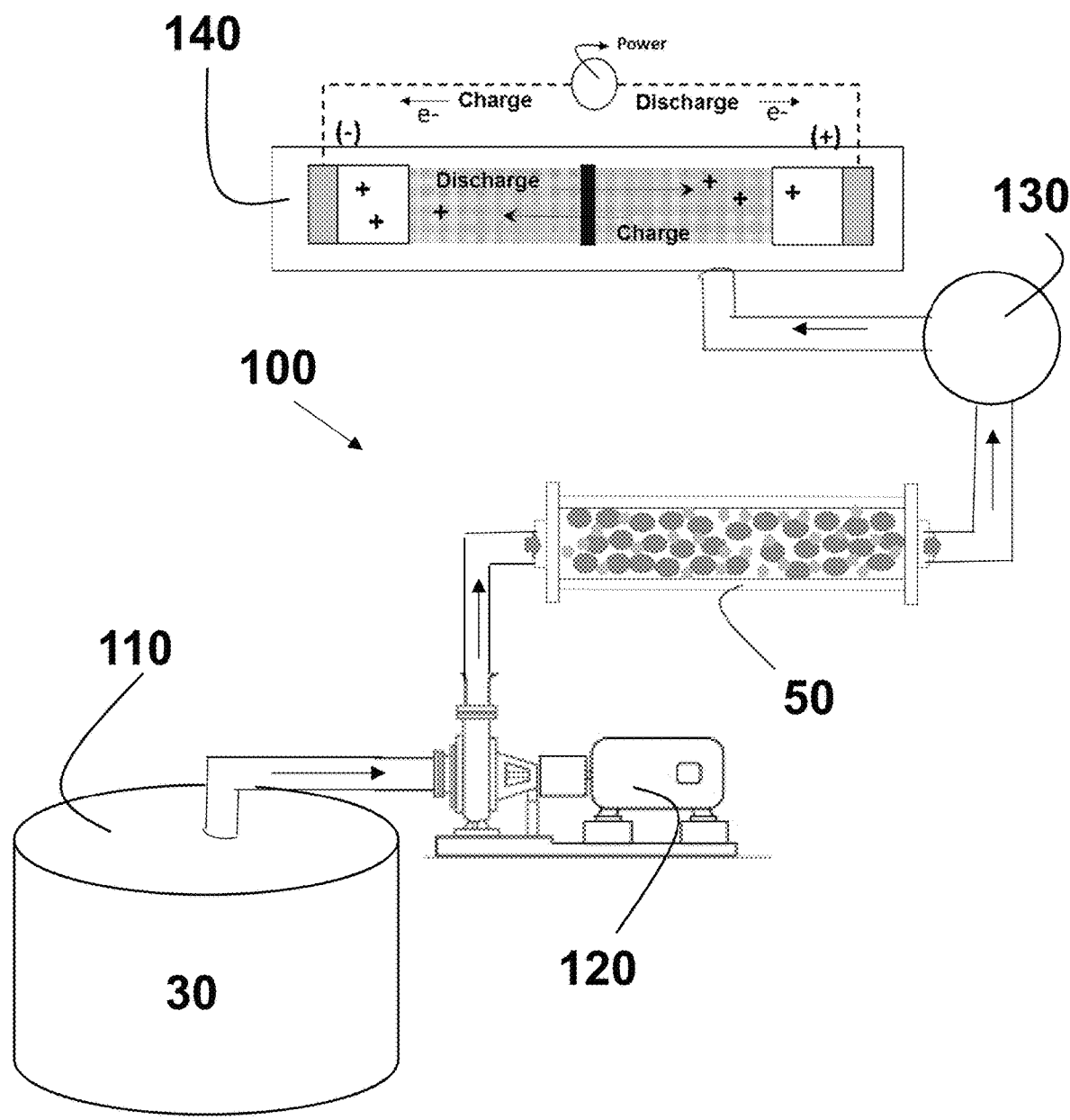
FIG. 3 is a schematic representation of a treatment system that incorporates the apparatus for removing impurities in an electrolyte according to the teachings of the present disclosure.

According to another aspect of the present disclosure, a treatment system for removing impurities from a non-aqueous electrolyte used in an electrochemical cell is provided. Referring now to FIG. 3, this treatment system 100 generally comprises a storage tank 110 containing the non-aqueous electrolyte 30; a pump 120 configured to cause the non-aqueous electrolyte 30 to flow; an electrochemical cell 140; at least one apparatus 50 formed as previously described above and further defined herein that is in fluid communication with both the storage tank 110 and the electrochemical cell 140; and a meter 130 configured to allow a predetermined amount of the non-aqueous electrolyte 30 to fill the electrochemical cell 140. The apparatus 50 generally comprises a vessel having one or more chambers with an inlet and outlet configured to allow the flow of the electrolyte there through and an inorganic scavenging agent located within the one or more chambers that comprises one or more types of a zeolite, at least one type of an absorbent filler particles, or a combination of the zeolite and absorbent filler particles. The inorganic scavenging agent absorbs one or more of moisture, free transition metal ions, or hydrogen fluoride (HF) that is present as impurities in the non-aqueous electrolyte.

The treatment system 100 may further comprise a control system (not shown) that is configured to control one or more of temperature or pressure in the apparatus; a flow rate for the electrolyte flowing through the apparatus; and for measuring the predetermined amount of the electrolyte that is allowed to fill the electrochemical cell. This control system may include a controller or computer along with corresponding software capable of monitoring sensors (e.g., pressure, temperature, flow rate, etc.) positioned within the treatment system and for controlling the operation of various components within the treatment system.

Figure 4:
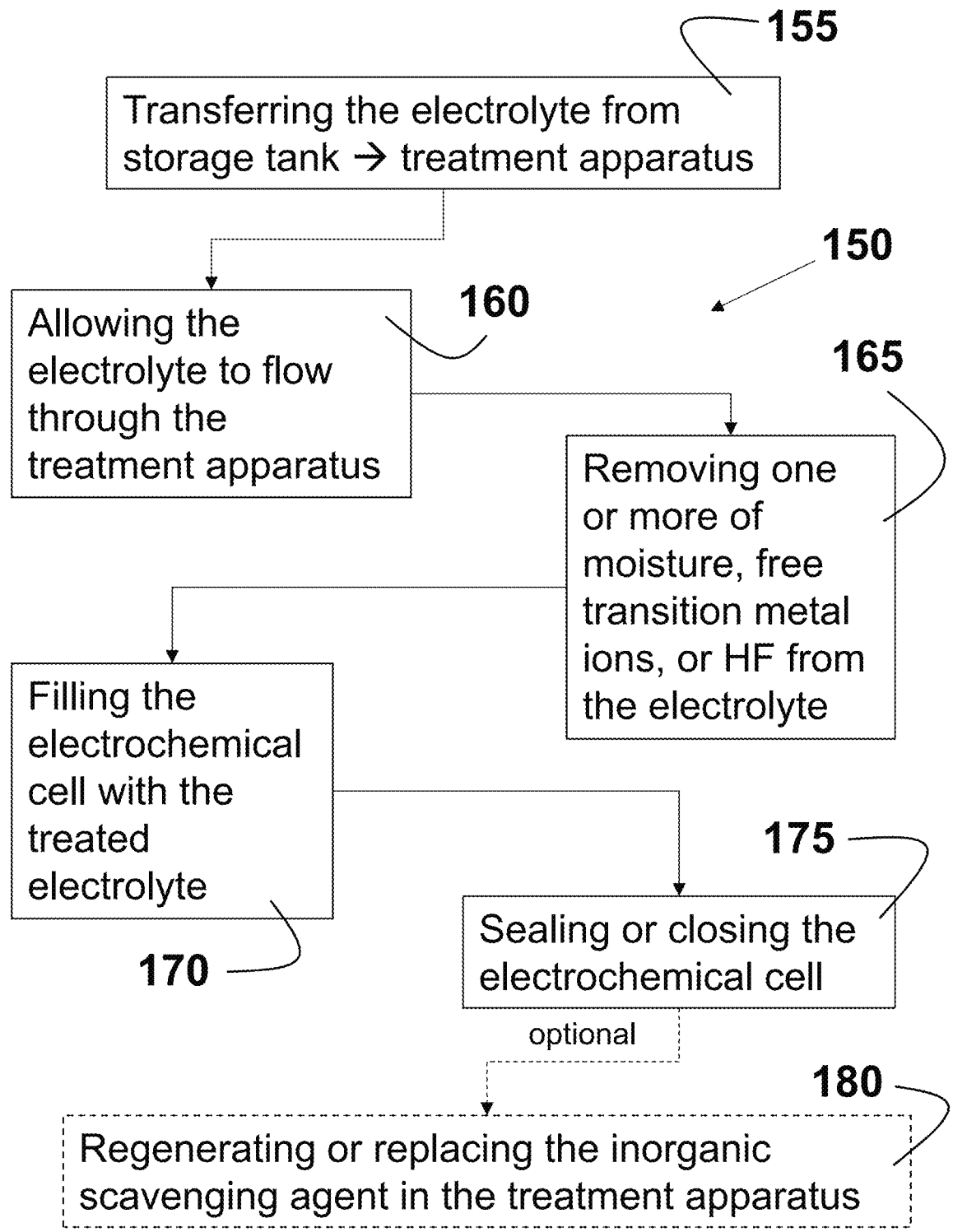
FIG. 4 is a flowchart illustrating a method for removing impurities in an electrolyte according to the teachings of the present disclosure.

According to yet another aspect of the present disclosure, a method for removing impurities from a non-aqueous electrolyte used in an electrochemical cell is provided. Referring now to FIG. 4, this method 150 generally utilizes the treatment system as previously described in FIG. 3 along with the apparatus as described in FIGS. 2A-2E. This method 150 comprises the steps of transferring 155 the non-aqueous electrolyte from a storage tank to an apparatus as previously described above. The method 150 allows the non-aqueous electrolyte to flow through the apparatus as previously defined. This apparatus generally comprises a vessel having one or more chambers with an inlet and an outlet configured to allow the flow of the electrolyte there through and an inorganic scavenging agent located within the one or more chambers that comprises one or more types of a zeolite, at least one type of an absorbent filler particles, or a combination of the zeolite and absorbent filler particles. The inorganic scavenging agent absorbs or removes 165 one or more of moisture, free transition metal ions, or hydrogen fluoride (HF) that is present as impurities in the non-aqueous electrolyte. The electrochemical cell is then filled 170 with a predetermined amount of the electrolyte that flows through the apparatus and exits the apparatus. The electrochemical cell is then sealed or closed 175.

Optionally, the method 150 may further comprise the step of regenerating or replacing 180 the inorganic scavenging agent in the apparatus. The inorganic scavenging agent should be regenerated or replaced prior to allowing any substantial amount of impurities to remain in the electrolyte. Alternatively, the inorganic scavenging agent is replaced by switching out the used apparatus for an unused apparatus. In some circumstances, the inorganic scavenging agent may be utilized to fill a single electrochemical cell or to fill multiple electrochemical cells.

Routine monitoring of the amount of moisture, transition metal ions and/or HF present in the treated electrolyte may be used to determine when regeneration or replacement of the inorganic scavenging agent is necessary. The presence of transition metal ions in the electrolyte may be determined by inductively coupled plasma-optical emission spectrometry (ICP-OES). The amount of HF present in the electrolyte may be analyzed using a fluoride ion specific (ISE) meter. The amount of moisture ($H_2O$) present in the electrolyte may be determined according to any conventional method, including but not limited to chromatography, Karl-Fischer titration, or the like.

The specific examples provided in this disclosure are given to illustrate various embodiments of the invention and should not be construed to limit the scope of the disclosure. The embodiments have been described in a way which enables a clear and concise specification to be written, but it is intended and will be appreciated that embodiments may be variously combined or separated without parting from the invention. For example, it will be appreciated that all preferred features described herein are applicable to all aspects of the invention described herein.

Within this specification, embodiments have been described in a way which enables a clear and concise specification to be written, but it is intended and will be appreciated that embodiments may be variously combined or separated without parting from the invention. For example, it will be appreciated that all preferred features described herein are applicable to all aspects of the invention described herein.

Those skilled-in-the-art, in light of the present disclosure, will appreciate that many changes can be made in the specific embodiments which are disclosed herein and still obtain alike or similar result without departing from or exceeding the spirit or scope of the disclosure. One skilled in the art will further understand that any properties reported herein represent properties that are routinely measured and can be obtained by multiple different methods. The methods described herein represent one such method and other methods may be utilized without exceeding the scope of the present disclosure.

The foregoing description of various forms of the invention has been presented for purposes of illustration and description. It is not intended to be exhaustive or to limit the invention to the precise forms disclosed. Numerous modifications or variations are possible in light of the above teachings. The forms discussed were chosen and described to provide the best illustration of the principles of the invention and its practical application to thereby enable one of ordinary skill in the art to utilize the invention in various forms and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. An apparatus for removing impurities from a non-aqueous electrolyte prior to being used in an electrochemical cell; the apparatus comprising:

a vessel that includes one or more chambers having an inlet and an outlet; the inlet configured to allow the electrolyte to enter the vessel in order for the electrolyte to flow through the one or more chambers, the outlet being in fluid communication with the electrochemical cell and configured to allow the electrolyte to exit the vessel in order to fill the electrochemical cell; and an inorganic scavenging agent located within the one or more chambers, such that the inorganic scavenging agent is held in place as the electrolyte flows there through; the inorganic scavenging agent comprising a mixture of one or more types of zeolite particles and at least one type of absorbent filler particles;

wherein the mixture absorbs one or more of moisture, free transition metal ions, or hydrogen fluoride (HF) that is present as impurities in the non-aqueous electrolyte.

2. The apparatus according to claim 1, wherein the vessel is constructed with a chamber having a predetermined volume, such that the vessel may withstand exposure to a pressure up to 500 psi and to a temperature of about 50° C., while exhibiting chemical resistance to degradation of physical properties in the presence of the electrolyte.

3. The apparatus according to claim 1, wherein the one or more types of zeolite particles exhibit a framework having a FAU structure, a MFI structure, a CHA structure, a LTA structure, a BEA structure, or a mixture thereof and a silica to alumina ratio (SAR) that is in the range of 1 to about 100.

4. The apparatus according to claim 1, wherein the absorbent filler particles consist essentially of aluminum oxide, copper sulfate, silica gel, calcium chloride, calcium sulfate, or a mixture thereof.

5. The apparatus according to claim 1, wherein the inorganic scavenging agent comprises a particle size ($D_{50}$) that is in the range of about 5 micrometers (μm) to about 100 micrometers (μm).

6. The apparatus according to claim 1, wherein the one or more types of zeolite particles comprises a sodium-ion concentration that is less than 25 wt. % based on the overall weight of the zeolite types.

7. The apparatus according to claim 6, wherein the one or more types of zeolite particles is a lithium-ion exchanged zeolite in which a lithium-ion has been exchanged for the sodium-ion, such that the concentration of the lithium ion is about 0.5 wt. % to about 20 wt. % based on the overall weight of the one or more types of zeolite particles.

8. The apparatus according to claim 1, wherein the inorganic scavenging agent scavenges transition-metal cations and hydrofluoric acid via an ion-exchange mechanism.

9. The apparatus according to claim 1, wherein the non-aqueous electrolyte is a solution of a lithium salt dispersed in an organic solvent.

10. The apparatus according to claim 9, wherein the non-aqueous electrolyte is a solution of $LiPF_6$ in a mixture of ethylene carbonate and diethyl carbonate (EC/DEC=50/50 vol.).

11. The apparatus according to claim 1, wherein the vessel further comprises at least one valve configured to allow the flow of the electrolyte through the chamber when the valve is open.

12. The apparatus according to claim 1, wherein the one or more types of zeolite particles and the absorbent filler particles fill the chamber, such that the composition comprises a homogenous mixture of zeolite and absorbent filler particles or a gradient mixture of zeolite and absorbent filler particles.

13. The apparatus according to claim 1, wherein the ratio of zeolite particles to absorbent filler particles is between 1:3 to 3:1.

14. The apparatus according to claim 1, wherein the one or more types of zeolite particles and the absorbent filler particles are present as loosely packed particles; particles compacted to form at least one tablet, disc, or extrudate shaped to fit into the chamber; or a combination thereof.

15. The apparatus according to claim 14, wherein the loosely packed particles are held in position by an internal surface of the vessel that forms the chamber, by the incorporation of one or more membranes, screens, or filters into the chamber, or a combination thereof, provided such membranes, screens, or filters allow the electrolyte to pass there through.

16. The apparatus according to claim 1, wherein the particle size ($D_{50}$) for the types of zeolite particles and the particle size ($D_{50}$) for the absorbent filler particles are different by at least a factor of 2.

17. A treatment system for removing impurities from a non-aqueous electrolyte used in an electrochemical cell: the system comprising:

the non-aqueous electrolyte;

a storage tank, the storage tank containing the non-aqueous electrolyte;

a pump configured to cause the non-aqueous electrolyte to flow;

an electrochemical cell;

at one apparatus formed according to claim 1, that is in fluid communication with both the storage tank and the electrochemical cell; and a meter configured to allow a predetermined amount of the non-aqueous electrolyte to fill the electrochemical cell.

18. The treatment system according to claim 17, wherein the treatment system further comprises a control system that is configured to control one or more of temperature or pressure in the apparatus; a flow rate for the electrolyte flowing through the apparatus; and the predetermined amount of the electrolyte that is allowed to fill the electrochemical cell.

19. A method for removing impurities from a non-aqueous electrolyte used in an electrochemical cell; the method comprising the steps of:

transferring the non-aqueous electrolyte from a storage tank to at least one apparatus formed according to claim 1;

allowing the non-aqueous electrolyte to flow through the at least one apparatus;

removing one or more of moisture, free transition metal ions, or hydrogen fluoride (HF) that is present as impurities in the non-aqueous electrolyte;

filling the electrochemical cell with a predetermined amount of the electrolyte that flows through the apparatus and exits the apparatus; and sealing or closing the electrochemical cell.

20. The method according to claim 19, wherein the method further comprises regenerating or replacing the inorganic scavenging agent in the at least one apparatus.

* * * * *